Sept. 14, 1965 E. BLANK 3,206,661
LOW INDUCTANCE CAPACITOR
Filed March 20, 1962 2 Sheets-Sheet 1

INVENTOR.
EDWARD BLANK
BY
Ezekiel Wolf, Wolf & Greenfield
ATTORNEYS

Sept. 14, 1965            E. BLANK            3,206,661
LOW INDUCTANCE CAPACITOR
Filed March 20, 1962            2 Sheets-Sheet 2
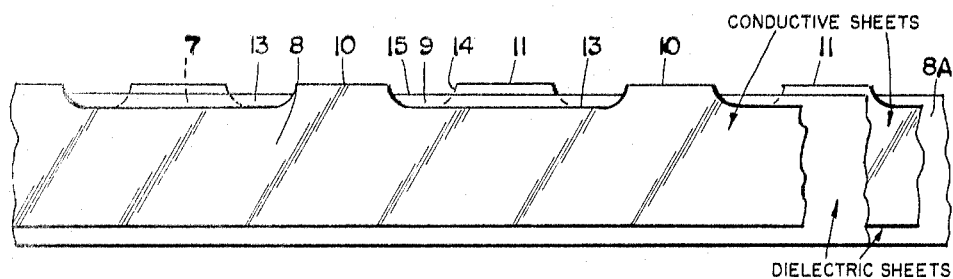
FIG.4
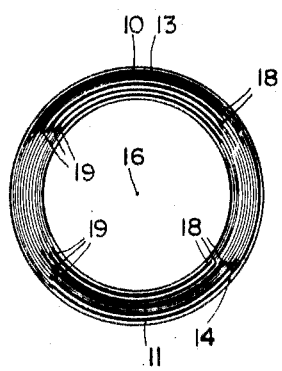
FIG.5
FIG.6
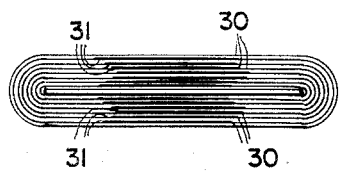
FIG.7
INVENTOR.
EDWARD BLANK
BY
Ezekiel Wolf, Wolf & Greenfield
ATTORNEYS United States Patent Office 3,206,661
Patented Sept. 14, 1965

3,206,661
LOW INDUCTANCE CAPACITOR
Edward Blank, Sharon, Mass., assignor to Tobe Deutschmann Laboratories, Canton, Mass., a partnership
Filed Mar. 20, 1962, Ser. No. 181,085
9 Claims. (Cl. 317—260)

This invention relates to a low inductance energy storage capacitor and a method of making it.

It is often desirable to extract the maximum amount of stored energy from an energy storage capacitor in the shortest possible time. Such fast discharging capacitors are finding increasing use particularly in the field of nuclear research and related experimentation. Other uses for low loss low inductance capacitors occur in programs requiring tank capacitors such as in high power R.F. generators where a high Q is an essential requirement. Energy storage capacitors have been designed which do provide a relatively high energy, often in the order of 6,000 joules which may be discharged in a time interval in the order of microsecond to milliseconds. In order to attain such discharge rates with full intensity, the capacitor must be designed and constructed so that the internal inductances and resistances are minimized. While such capacitors which have been designed heretofore are suitable for many fast discharge purposes, there is an increasing demand for capacitors capable of discharging at even faster times and having higher ringing frequency than heretofore possible.

It is therefore an object of the present invention to provide a high voltage, high capacity capacitor having extremely low inductance and capable of being designed to have extremely high ringing frequencies. It is also an object of the present invention to provide a low inductance energy storage capacitor having a long life expectancy and designed to minimize the destructive effects of internal stresses caused by rapid discharge of substantial amounts of energy.

A further object of the present invention is to provide a low inductance energy storage capacitor which is relatively compact and inexpensive in manufacture. Further objects of the present invention include the providing of energy storage capacitors adapted to be designed for high peak charging voltages and reversal voltages and capable of operating over a wide ambient temperature range.

A further object of the present invention is to provide a low inductance energy storage capacitor which is formed with inherently low inductance means for connecting the conductive plates of the capacitor to terminals.

A further object of the present invention is to provide a capacitor having its conductive plates formed integrally with short tabs adapted to be connected to terminals of the capacitor over very short paths having inherently low inductance.

A still further object of the present invention is to provide an improved method of forming wound capacitors wherein tabs for attachment to the capacitor terminals are formed of material comprising the conductive plates.

In the present invention there is provided a plurality of thin flexible sheets including a pair of conductive sheets in parallel facing relation with an intermediate dielectric sheet. The dielectric sheet electrically insulates these conductive sheets from each other. These sheets are continuously wound a plurality of times in spiral-like form about a center axis. The conductive sheets are each formed with cut-out portions along a side edge to provide a series of alternate projections and recesses adapted to form spaced connecting tabs. Each of the projections of each conductive sheet project beyond the same side edge of the dielectric sheet with the tabs of each conductive sheet aligned with the recesses of the other. All the tabs of one conductive sheet are positioned in facing adjacent relationship on one side of the center axis and all the tabs of the other conductive sheets are positioned in facing adjacent relationship on the other side of the center axis. Means provide an encasing for these sheets, and a pair of terminals are connected one to each of the tabs of one of the conductive sheets and the other to the tabs of the other conductive sheets.

These and other objects of the present invention will be more clearly understood when considered in connection with the accompanying drawings, in which:

FIG. 4 is a plan developed view of a segment of the sheets illustrated in FIG. 3;

FIG. 5 is a top view of an intermediate step in arranging the sheets shown in the embodiment of FIG. 3;

FIG. 6 is a top plan view of the arrangement shown in FIG. 3; and,

FIG. 7 is a modification of the arrangement illustrated in FIG. 6.

Figure 1:
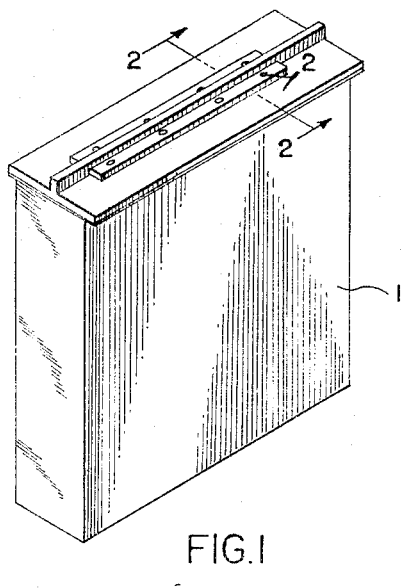
FIG. 1 is a perspective view of a capacitor embodying the present invention.
Figure 2:
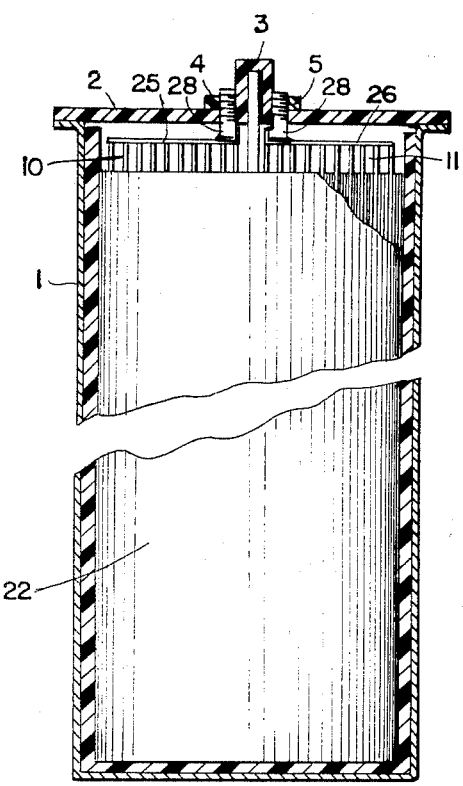
FIG. 2 is a cross sectional, somewhat schematic view taken substantially along the line 2—2 of FIG. 1.

Referring to FIG. 1, there is illustrated an embodiment of the invention utilizing a rectangular case 1. The invention is also applicable to capacitors having other forms, as for example, cylindrical. The choice of the capacitor shape is primarily determined by environmental factors such as the number of capacitors required for a particular use and the space in which they are to be installed. The case material 1 is formed of any suitable material, such for example as mild steel or stainless steel. A cover 2 of a suitable dielectric material is secured by conventional means to the upper periphery of the casing 1. This cover 2 may be formed with a longitudinally extending center ridge 3 on either side of which are provided low inductance parallel bus bars 4 and 5. These bus bars 4 and 5 may be suitably secured to the cover by conventional means.

The capacitor plates are formed of flexible conductive sheets of material such for example as thin aluminum foil illustrated at 7 and 8 in FIG. 4. The thickness of the conductive sheets 7 and 8 as well as the width may be varied depending upon the design parameters desired in a manner known to the art. These conductive sheets may or may not be of the same width and are arranged on opposite sides of a flexible dielectric sheet 9 in facing adjacent parallel relation. The dielectric sheet 9 electrically insulates the conductive sheets 7 and 8 from each other. This dielectric sheet may be formed of a high quality kraft capacitor tissue of high density structure. Other flexible dielectric sheets may be used depending upon the dielectric break-down strength and dissipation factors desired. Normally a plurality of such dielectric sheets are used in place of a single sheet if the design parameters so indicate. Ordinarily, in fast discharge energy storage capacitors, it is advantageous to use a plurality of thin gauge high density sheets instead of a single sheet of greater thickness for the purpose of increasing D.-C. voltage break-down strength and corona starting voltage levels.

Figure 3:
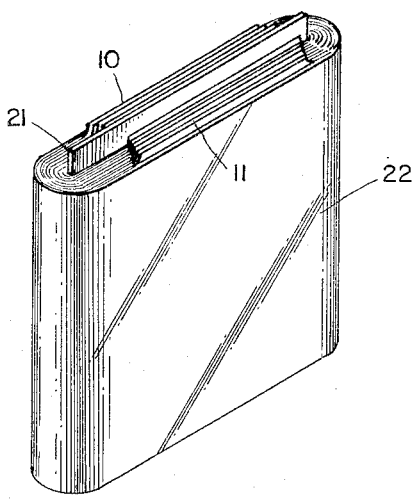
FIG. 3 is a perspective view of the wound sheets forming an essential element of the invention.

The conductive sheets 7 and 8 are formed with a plurality of projections 10 and 11 along corresponding side edges. These projections and their intermediate recesses 13 and 14 form spaced connecting tabs along corresponding edges of each conductive sheet 7 and 8. These tabs may be formed by cutting out the recesses 13 and 14. The tabs 10 are staggered with respect to the tabs 11 and are aligned with the recesses 13. The tabs have a total length at least preferably, one-third the total length of the conductive sheets and no more than a total length of one-half the length of the conductive sheets. These sheets 7, 8 and 9 are arranged with the tabs 10 and 11 projecting laterally beyond the side edge 15 of the dielectric sheet 9. This parallel arrangement of flexible sheets are wound preferably in a form illustrated in FIG. 5 so that the tabs 10 lie on one side of the center axis 16 and the tabs 11 lie on the other side of the center axis 16. An intermediate dielectric sheet 9 lying parallel to and between the sheets 7 and 8, insulates conductive sheets 7 and 8 from each other on winding. Sheet 8A is constructed similarly and of the same material as sheet 9. It is intended that the description of the tabs 10 and 11 as lying on opposite sides of the center axis 16 include any segregation of the tabs 10 from the tabs 11, whereby the tabs 10 may be electrically connected together and the tabs 11 may be electrically connected together independently of each other. In the arrangement illustrated in FIG. 5, the tabs 10 are arranged in staggered lapped relationship so that the surface areas of each tab 10 including those intermediate the outermost tabs are provided with the exposed surface portions 18 and 19. This arrangement may have significance in assuring maximum flow of current along exposed surfaces of these conducting tabs or projections. The annulus form illustrated in FIG. 5 can be used if desired in cylindrical capacitors. However, in the rectangular capacitor herein described, the wound-up parallel sheets are flattened into shape as illustrated in FIG. 6. Preferably an insulating center dielectric member 21 is positioned in the wound-up sheets to dielectrically insulate the projecting tabs 10 from the projecting tabs 11. This wound-up member 22 as illustrated in FIG. 3, is inserted within the casing. The tabs 10 and 11 are swaged respectively to the conducting members 25 and 26 which preferably extend the length of the tabs. These conducting members are connected to the terminal bars 4 and 5 by plate 28 to provide as wide and as short a conducting path for current within the capacitors as possible.

A suitable impregnant is contained within the capacitor. Such impregnants include for example, mineral oil, silicone fluid, polyisobutylene and chlorinated diphenyls.

As illustrated in FIG. 7, the tabs 10 and 11 may be staggered forward and rearwardly as indicated at 31 to provide a variant form of exposed surface.

In the arrangement disclosed the projections or tabs which are formed of the conducting sheets or foils, provide a better terminal lead than heretofore possible. In addition these integrally formed connecting tabs or projections avoid the likelihood of puncturing the dielectric material during forming. Such tabs also minimize the thickness and pressure required and thereby avoid the likelihood of damage due to the inherent stresses during operations at peak currents.

In forming the capacitor, the elongated sheets 7 and 8 are arranged on opposite sides of the conductive sheet 9 with the tabs projecting beyond the side edge 15 of the dielectric sheet 9. These sheets in their parallel facing relationship are then wound about a center axis, preferably on a mandrel to form the shape, preferably illustrated in FIG. 5. Following this, the wound parallel sheets having a spiral-like form are removed from the mandrel and are flattened into the configuration best illustrated in FIG. 6. The insulating board 21 is then inserted and the sheets as thus formed are inserted in a casing. Subsequently the tabs 10 are swaged together as are the tabs 11. These in turn are connected individually by conductive means to the terminal bars 4 and 5 and the cover 2 is secured to the casing, and the winding is impregnated and oiled.

Having now described my invention, I claim:

1. A low inductance capacitor having a plurality of parallel sheets including a pair of conductive sheets with means including an intermediate dielectric sheet electrically insulating said conductive sheets from each other,
with said sheets continuously wound about a center axis,
said conductive sheets each having a series of alternate projections and recesses adapted to form spaced connecting tabs integrally formed along a side edge,
each of the projections of each conductive sheet projecting beyond a single side edge of said dielectric sheet and being aligned with a recess of the other conductive sheet whereby the projections of one sheet are on one side of said center axis and the projections on the other sheet are on the other side of said center axis.

2. A low inductance capacitor as set forth in claim 1 wherein the side edges of adjacent projections are non-aligned thereby forming said projections in staggered relationship with exposed surface areas.

3. A low inductance capacitor as set forth in claim 2 wherein a portion of said staggered projections are staggered clockwise and a portion counterclockwise with respect to said center axis.

4. A low inductance capacitor as set forth in claim 2 wherein said projections have a total width of at least substantially one-third the length of the conductive sheet on which they are formed.

5. A low inductance capacitor having a plurality of thin flexible sheets including a pair of conductive sheets in parallel facing relation with an intermediate dielectric sheet,
with said dielectric sheet electrically insulating said conductive sheets from each other,
said sheets continuously wound a plurality of times about a center axis whereby each of said conductive sheets extends around each side of said axis a plurality of times,
said conductive sheets each having cut out portions along a single side edge
forming a series of alternate projections and recesses adapted to form spaced connecting tabs,
each of the projections of each conductive sheet projecting beyond the same side edge of said dielectric sheet with the tabs of each conductive sheet aligned with the recesses of the other,
said tabs of one conductive sheet positioned in facing adjacent relationship on one side of said center axis and said tabs of the other conductive sheet positioned in facing adjacent relationship on the other side of said center axis,
means encasing said sheets,
and a pair of terminals connected one to each of the tabs of one of said conductive sheets and the other to the tabs of the other conductive sheet.

6. A low inductance capacitor as set forth in claim 5 wherein said adjacent tabs are staggered with respect to each other.

7. A low inductance capacitor as set forth in claim 6 wherein said adjacent tabs are staggered clockwise and counterclockwise.

8. A low inductance capacitor as set forth in claim 6 wherein said tabs have a total length of at least substantially one third and no more than one half the length of the conductive sheet on which they are formed.

9. A low inductance capacitor as set forth in claim 8 wherein said adjacent tabs are formed at successively corresponding adjacent portions of said conductive sheets.

References Cited by the Examiner

UNITED STATES PATENTS

| | | | |
|---|---|---|---|
| 1,999,137 | 8/26 | Flewelling | 317—261 X |
| 2,298,118 | 10/42 | Gale et al. | 174—143 |
| 2,470,045 | 5/49 | Nagy | 317—260 |
| 2,878,433 | 3/59 | Beresford | 317—242 |

FOREIGN PATENTS

| | | |
|---|---|---|
| 447,678 | 4/48 | Canada. |
| 848,440 | 9/60 | Great Britain. |

JOHN F. BURNS, *Primary Examiner.*

JOHN P. WILDMAN, *Examiner.*